United States Patent
Berry

(10) Patent No.: US 11,365,163 B1
(45) Date of Patent: Jun. 21, 2022

(54) FERTILIZER PRODUCTS AND THEIR MAKING AND USE

(71) Applicant: BERRY FAMILY 2012 IRREVOCABLE TRUST—DAVID W. BERRY, Mexico, MO (US)

(72) Inventor: David Berry, Perry, MO (US)

(73) Assignee: BERRY FAMILY 2012 IRREVOCABLE TRUST DAVID W. BERRY, Mexico, MO (US)

( * ) Notice: Subject to any disclaimer, the term of this patent is extended or adjusted under 35 U.S.C. 154(b) by 0 days.

(21) Appl. No.: 16/901,188

(22) Filed: Jun. 15, 2020

Related U.S. Application Data

(60) Provisional application No. 62/862,591, filed on Jun. 17, 2019.

(51) Int. Cl.
| | |
|---|---|
| *C05G 1/00* | (2006.01) |
| *C05F 5/00* | (2006.01) |
| *C05D 5/00* | (2006.01) |
| *C05C 1/00* | (2006.01) |
| *C05D 1/02* | (2006.01) |
| *C05B 7/00* | (2006.01) |
| *C05C 9/00* | (2006.01) |

(52) U.S. Cl.
CPC ............ *C05G 1/00* (2013.01); *C05B 7/00* (2013.01); *C05C 1/00* (2013.01); *C05C 9/00* (2013.01); *C05D 1/02* (2013.01); *C05D 5/00* (2013.01); *C05F 5/002* (2013.01)

(58) Field of Classification Search
None
See application file for complete search history.

(56) References Cited

U.S. PATENT DOCUMENTS

| | | | | |
|---|---|---|---|---|
| 2,019,824 | A * | 11/1935 | Liehr | C05D 1/00 71/24 |
| 2,032,608 | A * | 3/1936 | Antrim | A01C 21/00 47/48.5 |
| 2,341,800 | A * | 2/1944 | Martin | A01C 21/00 71/1 |
| 2,531,360 | A * | 11/1950 | Martin | C05D 9/00 71/64.13 |
| 3,024,098 | A * | 3/1962 | Austin | C05G 1/00 71/29 |
| 3,502,458 | A * | 3/1970 | Schenk | A01C 21/00 71/64.13 |
| 3,892,552 | A * | 7/1975 | Gay, Jr. | A01C 21/00 71/1 |
| 3,933,458 | A * | 1/1976 | Philipp | C05B 7/00 71/27 |
| 4,348,218 | A * | 9/1982 | Bond, Jr. | C05G 5/45 71/1 |
| 5,021,077 | A * | 6/1991 | Moore | C05F 11/00 71/17 |

(Continued)

*Primary Examiner* — Wayne A Langel
(74) *Attorney, Agent, or Firm* — Lathrop GPM LLP

(57) ABSTRACT

An injection molded fertilizer product that is infrangible and sturdy and that dissolves over a predictable and extended time period. The product includes corn gluten meal and magnesium oxide, and may be prepared by injection molding, with the corn gluten meal and magnesium oxide being injection molded at a pressure between 15,000 PSI and 27,000 PSI and at an injection temperature between 140° F. and 200° F.

9 Claims, 3 Drawing Sheets

(56) References Cited

U.S. PATENT DOCUMENTS

| | | | | |
|---|---|---|---|---|
| 5,549,730 | A * | 8/1996 | Aoki | C05G 5/45 |
| | | | | 71/64.03 |
| 6,120,574 | A * | 9/2000 | Moore | C05G 5/45 |
| | | | | 71/64.13 |
| 6,225,258 | B1 * | 5/2001 | Moore | A01N 25/34 |
| | | | | 504/101 |
| 6,881,008 | B1 * | 4/2005 | Maile | B09B 3/0025 |
| | | | | 106/132.2 |
| 2002/0104347 | A1 * | 8/2002 | Sakamoto | C05C 9/02 |
| | | | | 71/27 |
| 2006/0065028 | A1 * | 3/2006 | Nudelman | C05F 5/002 |
| | | | | 71/23 |
| 2015/0329435 | A1 * | 11/2015 | Hardy | A01N 65/06 |
| | | | | 424/529 |
| 2016/0102024 | A1 * | 4/2016 | Schrader | C05F 5/002 |
| | | | | 71/24 |

* cited by examiner

PRIOR ART
BRIQUETTE

FERTILIZER PRODUCTS AND THEIR MAKING AND USE

RELATED APPLICATION

This application claims the benefit of U.S. Provisional Patent Application No. 62/862,591, filed Jun. 17, 2019, the disclosure of which is incorporated by reference herein in its entirety.

BACKGROUND

Fertilizer products are typically made in solid (e.g., granular) or liquid forms. Traditional fertilizer contains mostly inorganic ingredients, but newer products may contain both organic and inorganic ingredients. Application of fertilizer products may appear simple and easy; however, for certain fertilizer, it may be difficult to control the exact amount to apply. Also, certain fertilizer products may not last for a long period of time and may require frequent applications.

Spike products have been designed for slow release of fertilizer into the soil. Existing fertilizer spike products are briquetted or extruded in shapes that are brittle in nature. To prevent breakage of the spikes, some manufacturers install plastic caps on the spike, and some users predrill the soil to allow the spikes to be pushed into the ground without breakage. However, these products easily dissolve into the ground and tend to rapidly disperse ingredients into the soil, which may cause fertilizer burn to the plants, shrub, or trees.

SUMMARY OF THE INVENTION

The presently disclosure provides a fertilizer product, such as having the form factor of a spike, that overcomes the deficiencies associated with the prior art. Specifically, the present disclosure provides products that are infrangible and sturdy, enabling them to be disposed in otherwise challenging locations without the need for multiple tools such as drills or augers. For example, fertilizer spikes produced according to the present disclosure are sufficiently rigid to withstand being hammered into dry, hard soil with breaking. This rigidity also enhances the ability of such fertilizer products to dissolve over a predictable and extended time period.

In an embodiment, the present disclosure pertains to a fertilizer product of 10%-50% (w/w) corn gluten meal and 10%-50% (w/w) magnesium oxide. The fertilizer product may be prepared by injection molding, with the corn gluten meal and magnesium oxide being injection molded at a pressure between 15,000 PSI and 27,000 PSI and at an injection temperature between 140° F. and 200° F.

In an aspect, the fertilizer product has a dissolve period of 30-60 days.

In another aspect, the fertilizer product further includes 1%-30% (w/w) glycerin.

The fertilizer product may further include at least 50% (w/w) of an ingredient such as nitrogen, phosphate, potash, rice hulls, soybean meal, feather meal, blood meal, bone meal, and sulphate of potash. In a further aspect, the fertilizer product includes 1%-15% (w/w) urea, 1%-15% (w/w) potassium chloride, 1%-15% (w/w) monoammonium phosphate, 1%-10% (w/w) potassium-enriched liquid fertilizer, and 1%-15% (w/w) urea-ammonium nitrate.

Further still, the fertilizer product may include 1%-15% (w/w) soybean hulls, or 1%-15% (w/w) ground rice hulls.

Lastly, the fertilizer product may have a dissolve period of 45-60 days.

DESCRIPTION OF THE INVENTION

Figure 1:
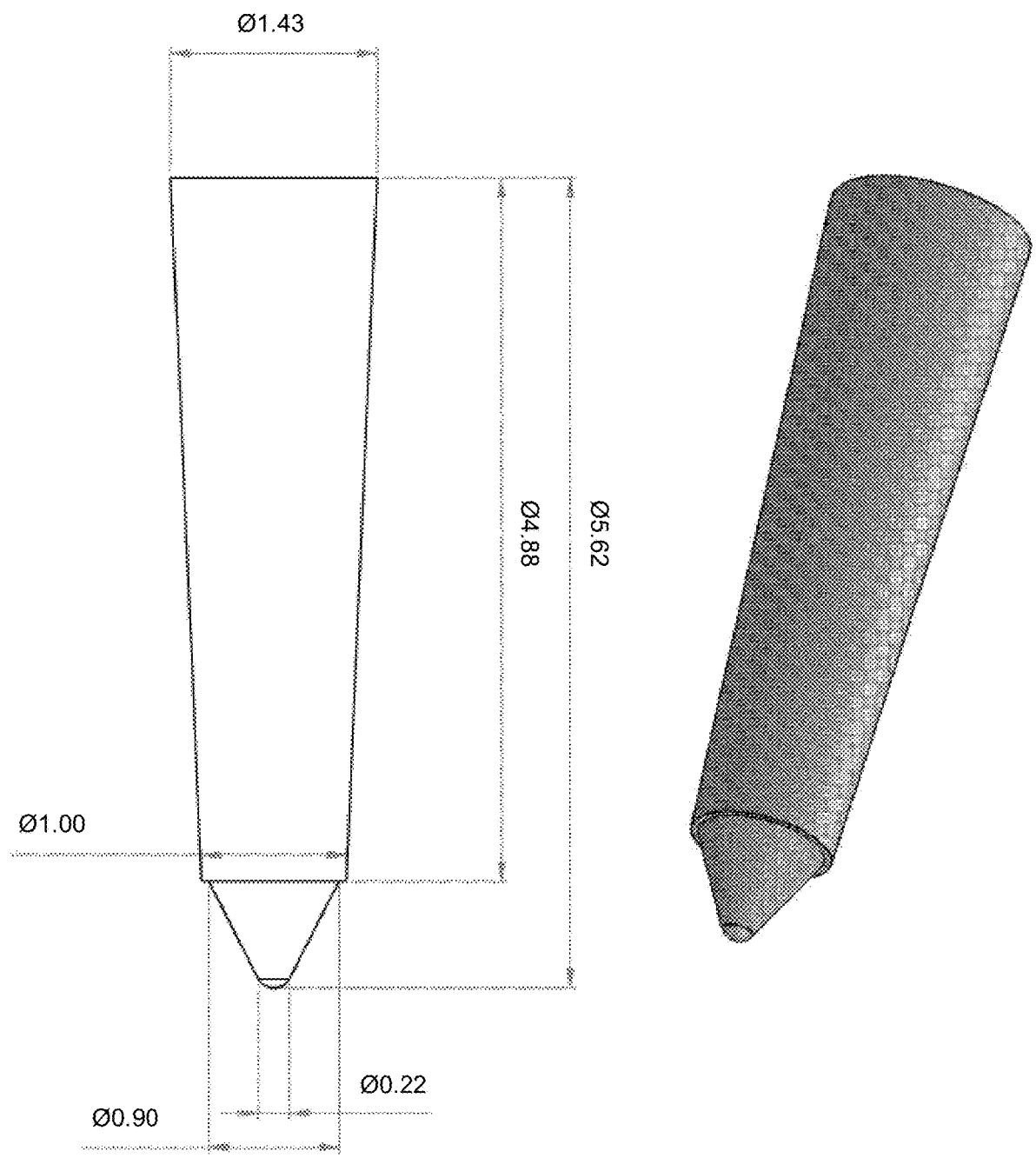
FIG. 1 illustrates one example of the fertilizer product according to the present disclosure with dimensions in inches.
Figure 2:
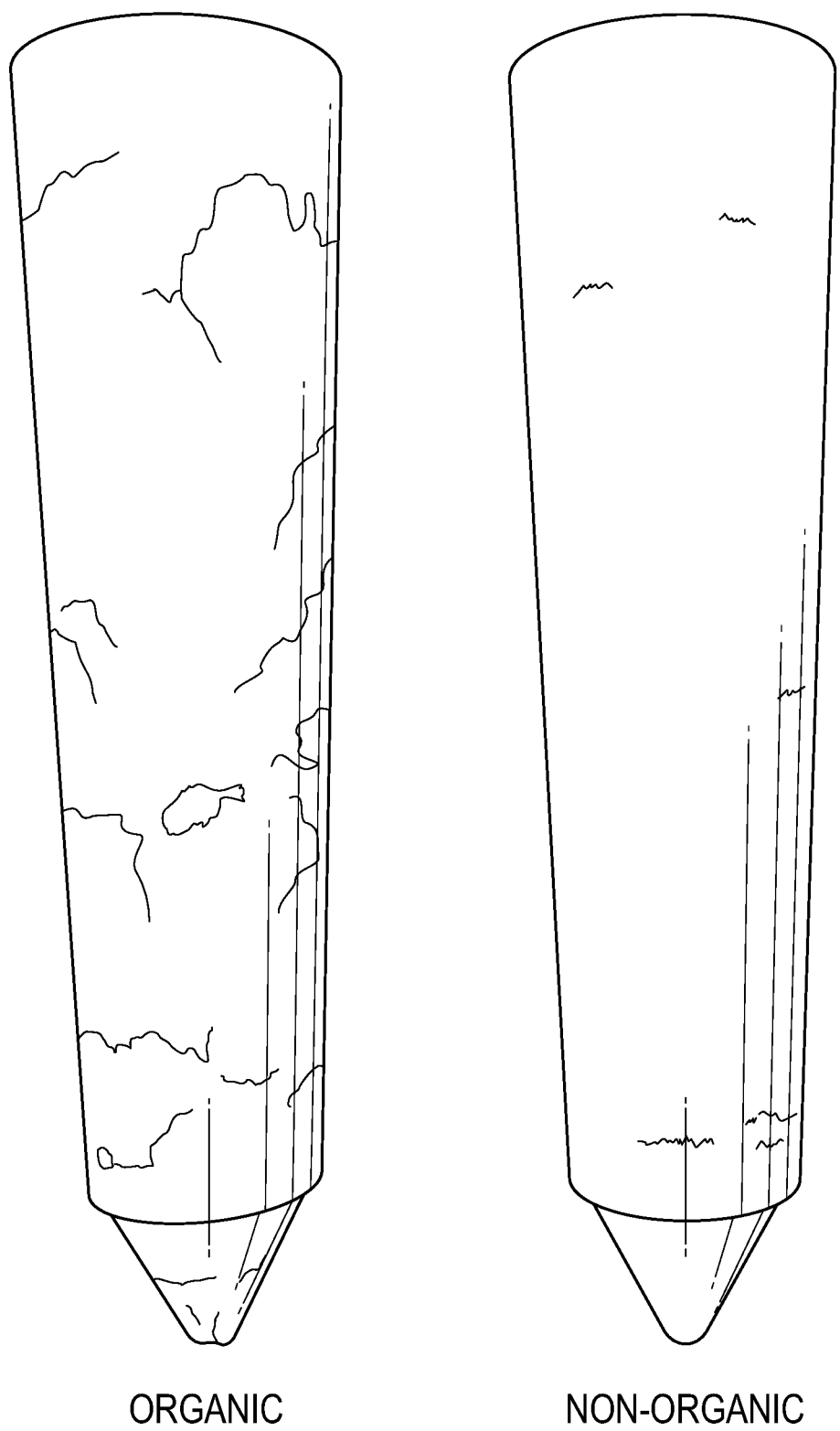
FIG. 2 shows a photo of a non-organic and an organic version of the fertilizer product according to the present disclosure.
Figure 3:
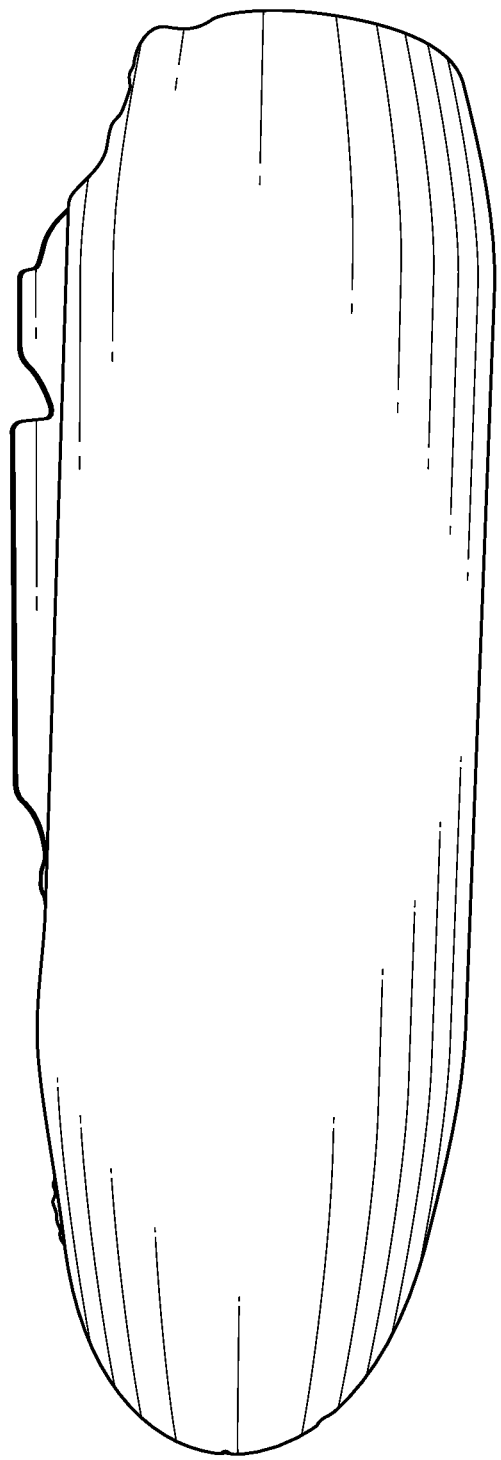
FIG. 3 shows a photo of a briquetted fertilizer product manufactured according to prior methods.

Various embodiments of the present invention provide durable fertilizer spikes that may be hammered into the ground. Organic and non-organic embodiments are disclosed, and examples of the products are shown in the accompanying figures.

Molded fertilizer products (e.g., spikes or wedges) are produced under high pressure to obtain a product that may have the NPK values whether organically or non-organically to benefit most plant types. The recipe, whether organic or non-organic, can be adjusted to produce a specific fertilizer product to a specific plant type.

In one embodiment, an organic version of the fertilizer product contains corn gluten meal ranging from 10% to 50% by weight of the product, or from 15% to 30%, and by way of example, at about 15%, 20%, 25%, or 30%. In another embodiment, the organic version of the fertilizer product also contains glycerin ranging from 1% to 30% by weight of the product, or from 1% to 15%, and by way of example, at about 2%, 5%, 8%, 12%, or 15%. In another embodiment, the organic version of the fertilizer product also contains water ranging from 0% to 10% of the product, or from 0% to 5%, and by way of example, at about 0%, 1%, 2%, 3%, 4%, or 5%. In another embodiment, the organic version of the fertilizer product also contains magnesium oxide ranging from 10% to 50% of the product, or from 10% to 30%, and by way of example, at about 10%, 15%, 20%, 25%, or 30%.

Corn gluten meal itself is considered an organic fertilizer product containing about 10% nitrogen. To increase nitrogen and other nutrients, phosphate and potash and other organic ingredients such as rice hulls, soybean meal, feather meal, blood meal, bone meal, and sulphate of potash may be added to achieve desired NPK values. Such a mixture may form at least 50% of the fertilizer product, for example, such a mixture may form 50% to 60% of the fertilizer product, for example, at about 50%, 52%, 54%, 56%, 58%, or 60%. In one embodiment, the organic molded fertilizer product may consist essentially of only the constituents set forth above.

In another embodiment, a non-organic version of the fertilizer product contains corn gluten meal ranging from 20% to 60% by weight of the product, or from 30% to 60%, and by way of example, about 30%, 40%, 50%, or 60%. In another embodiment, the non-organic version of the fertilizer product also contains water ranging from 0% to 10% of the product, or from 0% to 5%, and by way of example, at about 0%, 1%, 2%, 3%, 4%, or 5%. In another embodiment, the non-organic version of the fertilizer product also contains magnesium oxide ranging from 10% to 50% of the product, or from 10% to 30%, and by way of example, at about 10%, 15%, 20%, 25%, or 30%.

To produce the non-organic product, other ingredients may be added to achieve the desired NPK values. Examples of these other ingredients include but are not limited to potassium chloride, diammonium phosphate, urea, dicalcium phosphate, monoammonium phosphate, and triple super phosphate. For example, embodiments may include urea (ranging from 0% to 15% of the product, and more desirably from 1% to 15%, for example, about 3%, 6%, 9%, 12%, or 15%), potassium chloride (ranging from 0% to 15% of the product, and more desirably from 5% to 10%, for example, about 5%, 6%, 7%, 8%, 9%, or 10%), monoammonium phosphate (ranging from 1% to 15% of the product, and more desirably from 5% to 15%, for example, about 5%, 10%, or 15%), potassium-enriched liquid fertilizer (ranging from 1% to 10%, for example, about 2%, 4%, 6%, 8%, or 10%), and urea-ammonium nitrate (ranging from 1% to 15%, for example, about 3%, 6%, 9%, 12%, or 15%). Higher NPK values may be achieved by adding non-organic ingredients or by adding organic ingredients. Although adding non-organic ingredients may appear easier, the NPK values of most fertilizer products may be achieved by adding organic ingredients.

To form the products, the organic or non-organic constituents are molded at high pressures. The molding process includes using plastic injection molding methods with a water or oil heated barrel that operates at a barrel temperature ranging from 180° F. to 250° F. (and more desirably from 200° F. to 250° F., for example, about 200° F., 210° F., 220° F., 230° F., 240° F., or 250° F.). The heat from the barrel allows the ingredients to become a slurry then injected into a mold at a temperature ranging from 140° F. to 200° F. (and more desirably from 150° F. to 200° F., for example, about 150° F., 160° F., 170° F., 180° F., 190° F., or 200° F.) and packed into the mold at pressures ranging from 8,000 PSI to 27,000 PSI (and more desirably from 15,000 PSI to 27,000 PSI, for example, about 15,000 PSI, 18,000 PSI, 21,000 PSI, 24,000 PSI, or 27,000 PSI). In one embodiment, the fertilizer product is neither thermoplastic nor thermoset in nature, but it requires heat and pressure to allow the proteins of the corn gluten meal to bind the ingredients together.

As both the organic and non-organic products are produced under high pressure, the products may take up to 60 days (e.g., 30-60 days, or 45-60 days) to dissolve, which helps prevent fertilizer burn. The delay time to dissolve can be adjusted with the addition of such items as soybean hulls and ground rice hulls. For purpose of this disclosure, the term "dissolve time" means the length of the period from the time the fertilizer product is inserted into soil to the time when the fertilizer product releases substantially all of its ingredients into soil.

The fertilizer product that is injected molded may be produced with a point or narrow area as shown in the accompanying figures to allow easy insertion into all soil conditions. The top side of the fertilizer product may be large enough for a blunt instrument such as a hammer to enable the fertilizer product (whether a spike or a wedge) to be easily inserted entirely in the soil. However, these formulations can also be molded into multiple other shapes, including but not limited to a stake used for erosion control products such as turbidity curtains, blankets, silt fences, and other products designed to last a short period of time.

Unless otherwise specified, all percentage used in the instant disclosure is on weight basis.

The invention claimed is:

1. A fertilizer product prepared by injection molding, comprising:
   10%-50% (w/w) corn gluten meal; and
   10%-50% (w/w) magnesium oxide,
   wherein the corn gluten meal and magnesium oxide are injection molded at a pressure between 16,000 PSI and 27,000 PSI and an injection temperature between 140° F. and 200° F.

2. The fertilizer product of claim 1, wherein the fertilizer product has a dissolve period of 30-60 days.

3. The fertilizer product of claim 1, further comprising 1%-30% (w/w) glycerin.

4. The fertilizer product of claim 1, further comprising at least 50% (w/w) of an ingredient selected from the group consisting of nitrogen, phosphate, potash, rice hulls, soybean meal, feather meal, blood meal, bone meal, and sulphate of potash.

5. The fertilizer product of claim 1, further comprising
   1%-15% (w/w) urea;
   1%-15% (w/w) potassium chloride;
   1%-15% (w/w) monoammonium phosphate;
   1%-10% (w/w) potassium-enriched liquid fertilizer; and
   1%-15% (w/w) urea-ammonium nitrate.

6. The fertilizer product of claim 1, further comprising 1%-15% (w/w) soybean hulls.

7. The fertilizer product of claim 1, further comprising 1%-15% (w/w) ground rice hulls.

8. The fertilizer product of claim 1, wherein the dissolve period is 45-60 days.

9. The fertilizer product of claim 1, wherein the corn gluten meal and magnesium oxide are injection molded at a pressure of 18,000 PSI and an injection temperature between 140° F. and 200° F.

* * * * *